United States Patent
Chen et al.

(10) Patent No.: US 10,035,402 B2
(45) Date of Patent: *Jul. 31, 2018

(54) THERMAL DISSIPATION SYSTEM OF AN ELECTRIC VEHICLE

(71) Applicant: THUNDER POWER NEW ENERGY VEHICLE DEVELOPMENT COMPANY LIMITED, Central (HK)

(72) Inventors: Yong-Syuan Chen, New Taipei (TW); Ming-Hui Ho, Tainan (TW); Jen-Chieh Hsiao, Taipei (TW)

(73) Assignee: THUNDER POWER NEW ENERGY VEHICLE DEVELOPMENT COMPANY LIMITED, Central (HK)

(*) Notice: Subject to any disclaimer, the term of this patent is extended or adjusted under 35 U.S.C. 154(b) by 0 days.

This patent is subject to a terminal disclaimer.

(21) Appl. No.: 15/397,087

(22) Filed: Jan. 3, 2017

(65) Prior Publication Data
US 2017/0113509 A1    Apr. 27, 2017

Related U.S. Application Data

(63) Continuation of application No. 14/842,803, filed on Sep. 1, 2015, now Pat. No. 9,550,406.

(Continued)

(51) Int. Cl.
*B60H 1/02*    (2006.01)
*B60H 1/32*    (2006.01)
(Continued)

(52) U.S. Cl.
CPC ....... *B60H 1/00278* (2013.01); *B29C 65/002* (2013.01); *B32B 3/266* (2013.01);
(Continued)

(58) Field of Classification Search
CPC ............ B60H 1/00271; B60H 1/00278; B60H 1/00557; B60H 1/00564; B60H 1/14;
(Continued)

(56) References Cited

U.S. PATENT DOCUMENTS 6,357,541 B1    3/2002  Matsuda et al.
6,450,275 B1 *  9/2002  Gabriel ................... B60K 6/22
                                                        165/41

(Continued)

FOREIGN PATENT DOCUMENTS

CN    102089172 A    9/2013
CN    102442199 A    2/2016
(Continued)

OTHER PUBLICATIONS

European Search Report for EP 16 16 0441 dated Jul. 7, 2016, all pages.

(Continued)

*Primary Examiner* — John D Walters
(74) *Attorney, Agent, or Firm* — Kilpatrick Townsend & Stockton LLP

(57) ABSTRACT

The present disclosure relates to a thermal dissipation system of an electric vehicle that includes: a heat exchanger arranged at the front part of the electric vehicle for providing heating or cooling to an air conditioning system of the electric vehicle; a first heat sink and a second heat sink, which are respectively arranged at the two sides of the front part of the heat exchanger; a number of rotatable and adjustable air deflectors for changing the flow direction of the air flowing through the heat dissipation system. Temperature sensors are included within the thermal dissipation system for sensing the working temperatures and the environmental temperatures of a battery pack and a motor of the electric vehicle. Opening and closing states of the air deflec- (Continued)

tors are adjusted in accordance with data provided by the temperature sensors.

20 Claims, 4 Drawing Sheets

Related U.S. Application Data

(60) Provisional application No. 62/150,848, filed on Apr. 22, 2015, provisional application No. 62/133,991, filed on Mar. 16, 2015.

(51) Int. Cl.

| | | |
|---|---|---|
| B60H 1/00 | (2006.01) | |
| B60L 11/18 | (2006.01) | |
| H02J 7/00 | (2006.01) | |
| B29C 65/00 | (2006.01) | |
| B32B 3/26 | (2006.01) | |
| B32B 7/04 | (2006.01) | |
| B60L 1/02 | (2006.01) | |
| B60H 1/14 | (2006.01) | |
| B60R 1/00 | (2006.01) | |
| G06F 3/00 | (2006.01) | |
| G06F 3/01 | (2006.01) | |
| G06F 3/041 | (2006.01) | |
| G06K 9/00 | (2006.01) | |
| H01M 10/613 | (2014.01) | |
| H01M 10/625 | (2014.01) | |
| H01M 10/6557 | (2014.01) | |
| H01M 10/48 | (2006.01) | |
| B60K 11/04 | (2006.01) | |
| B60K 11/08 | (2006.01) | |
| F25B 29/00 | (2006.01) | |
| H01M 10/663 | (2014.01) | |
| H01M 10/6563 | (2014.01) | |
| C09J 5/00 | (2006.01) | |
| F16B 11/00 | (2006.01) | |
| H01M 10/658 | (2014.01) | |
| H01M 10/63 | (2014.01) | |
| H01M 10/6568 | (2014.01) | |
| B60H 1/22 | (2006.01) | |
| B60K 1/04 | (2006.01) | |
| B32B 15/00 | (2006.01) | |
| B32B 15/01 | (2006.01) | |
| F16B 3/00 | (2006.01) | |
| F16B 5/04 | (2006.01) | |
| H01M 10/6566 | (2014.01) | |
| G06F 3/0482 | (2013.01) | |
| G06F 3/0484 | (2013.01) | |
| G06F 3/0486 | (2013.01) | |
| G06F 3/0488 | (2013.01) | |
| B60K 1/00 | (2006.01) | |

(52) U.S. Cl.
CPC ............ *B32B 7/04* (2013.01); *B32B 7/045* (2013.01); *B32B 15/00* (2013.01); *B32B 15/01* (2013.01); *B60H 1/00021* (2013.01); *B60H 1/00321* (2013.01); *B60H 1/00328* (2013.01); *B60H 1/00392* (2013.01); *B60H 1/00428* (2013.01); *B60H 1/00564* (2013.01); *B60H 1/00571* (2013.01); *B60H 1/00885* (2013.01); *B60H 1/143* (2013.01); *B60H 1/2215* (2013.01); *B60K 1/04* (2013.01); *B60K 11/085* (2013.01); *B60L 1/02* (2013.01); *B60L 11/1809* (2013.01); *B60L 11/1848* (2013.01); *B60L 11/1861* (2013.01); *B60L 11/1862* (2013.01); *B60L 11/1864* (2013.01); *B60L 11/1874* (2013.01); *B60L 11/1875* (2013.01); *B60L 11/1879* (2013.01); *B60R 1/00* (2013.01); *C09J 5/00* (2013.01); *F16B 3/005* (2013.01); *F16B 5/04* (2013.01); *F16B 11/00* (2013.01); *F25B 29/00* (2013.01); *G06F 3/005* (2013.01); *G06F 3/017* (2013.01); *G06F 3/0416* (2013.01); *G06F 3/0482* (2013.01); *G06F 3/0486* (2013.01); *G06F 3/0488* (2013.01); *G06F 3/04842* (2013.01); *G06F 3/04847* (2013.01); *G06K 9/00013* (2013.01); *G06K 9/00342* (2013.01); *G06K 9/00832* (2013.01); *H01M 10/482* (2013.01); *H01M 10/486* (2013.01); *H01M 10/613* (2015.04); *H01M 10/625* (2015.04); *H01M 10/63* (2015.04); *H01M 10/658* (2015.04); *H01M 10/6557* (2015.04); *H01M 10/6563* (2015.04); *H01M 10/6566* (2015.04); *H01M 10/6568* (2015.04); *H01M 10/663* (2015.04); *H02J 7/0019* (2013.01); *H02J 7/0021* (2013.01); *B32B 2605/00* (2013.01); *B32B 2605/08* (2013.01); *B32B 2605/18* (2013.01); *B60H 2001/003* (2013.01); *B60H 2001/00092* (2013.01); *B60H 2001/00949* (2013.01); *B60K 2001/005* (2013.01); *B60K 2001/006* (2013.01); *B60R 2300/8006* (2013.01); *B60Y 2200/91* (2013.01); *B60Y 2306/07* (2013.01); *B60Y 2400/112* (2013.01); *F16B 11/006* (2013.01); *H01M 2220/20* (2013.01); *Y10T 428/24347* (2015.01)

(58) Field of Classification Search
CPC .............. B60H 1/143; B60H 2001/003; B60H 2001/00307; B60H 1/00021; B60H 1/00321; B60H 1/00328; B60H 1/00392; B60H 1/00428; B60H 1/00571; B60H 1/00884; B60H 1/2215; B60H 2001/00092; B60H 2001/00949; B60H 2001/005; B60H 2001/006; B60L 11/187; B60L 11/1874; B60L 11/1809; B60L 11/1848; B60L 11/1861; B60L 11/1862; B60L 11/1864; B60L 11/1875; B60L 11/1879
USPC ...................... 180/68.1, 68.2, 68.4
See application file for complete search history.

(56) References Cited

U.S. PATENT DOCUMENTS

| | | | |
|---|---|---|---|
| 8,020,656 B2 * | 9/2011 | Inoue ............... | B60K 6/40 180/68.4 |
| 8,479,855 B2 * | 7/2013 | Kim ............... | B60K 11/02 180/68.3 |
| 8,955,345 B2 * | 2/2015 | Meitinger ......... | B60H 1/00271 62/239 |
| 9,250,020 B2 * | 2/2016 | Vikstrom ............ | F28D 1/0443 |
| 9,550,406 B2 | 1/2017 | Chen et al. | |
| 9,604,546 B2 | 3/2017 | Chen et al. | |
| 2006/0211364 A1 | 9/2006 | Brotz et al. | |
| 2009/0023056 A1 | 1/2009 | Adams et al. | |
| 2012/0168125 A1 | 7/2012 | Johnston et al. | |
| 2012/0222833 A1 | 9/2012 | Vikstrom et al. | |
| 2012/0297809 A1 * | 11/2012 | Carpenter .......... | B60L 1/003 62/244 |

(56) References Cited

U.S. PATENT DOCUMENTS

2016/0272036 A1   9/2016   Chen et al.
2017/0166032 A1   6/2017   Chen et al.

FOREIGN PATENT DOCUMENTS

| | | |
|---|---|---|
| CN | 103648808 A | 8/2016 |
| CN | 205768468 U | 12/2016 |
| DE | 102011016613 A1 | 11/2011 |
| DE | 102011080777 A1 | 6/2012 |
| EP | 1 990 849 A1 | 11/2008 |
| JP | 2014223867 A | 12/2014 |
| KR | 10-2012-0061236 A | 6/2012 |
| WO | 2006/124663 A2 | 11/2006 |
| WO | 2011/029538 A1 | 3/2011 |
| WO | 2011029538 A1 | 3/2011 |
| WO | 2015/035406 A1 | 3/2015 |

OTHER PUBLICATIONS

U.S. Appl. No. 14/967,373, filed Dec. 14, 2015, Non Final Office Action dated Apr. 29, 2016, all pages.

U.S. Appl. No. 14/967,373, filed Dec. 14, 2015, Final Office Action dated Sep. 2, 2016, all pages.

U.S. Appl. No. 14/967,373, filed Dec. 14, 2015, Notice of Allowance dated Nov. 16, 2016, all pages.

U.S. Appl. No. 14/842,803, filed Sep. 1, 2015, Non Final Office Action dated Apr. 29, 2016, all pages.

U.S. Appl. No. 14/542,803, filed Sep. 1, 2015, Notice of Allowane dated Sep. 12, 2016, all pages.

U.S. Appl. No. 15/436,492, filed Feb. 17, 2017, Notice of Allowance dated Oct. 5, 2017, all pages.

European Office Action dated Apr. 9, 2018 in the corresponding European application(application No. 18151739.2).

\* cited by examiner

THERMAL DISSIPATION SYSTEM OF AN ELECTRIC VEHICLE

CROSS-REFERENCE TO RELATED APPLICATIONS

The present application is a continuation of U.S. Non-provisional patent application Ser. No. 14/842,803, filed Sep. 1, 2015, which claims priority to U.S. Provisional Patent Application No. 62/133,991, filed on Mar. 16, 2015, and U.S. Provisional Patent No. 62/150,848, filed on Apr. 22, 2015, the disclosures of which are hereby incorporated by reference in their entireties for all purposes.

BACKGROUND

1. Field

The present disclosure relates to thermal dissipation systems for electric vehicles. In particular, a thermal dissipation system configured to recapture heat dissipated from other operational components of the electric vehicle is discussed.

2. Description of Related Art

The present invention relates to an assembly of a heat exchanger used by an air conditioner of an electric vehicle and heat sinks used by a battery and/or a motor. Based on a new design of the electric vehicle, the heat sinks thereof can be arranged on two sides of a portion of the heat exchanger, in order to enable the heat exchanger to take full advantage of waste heat being dissipated by the heat sinks. There is a need to design particular air to enable the heat source from the heat sinks to be absorbed into the heat exchanger, so as to provide optimal heat source management under various conditions.

SUMMARY

To achieve the above purpose, this disclosure describes a thermal dissipation system of an electric vehicle including: a heat exchanger arranged at an air inlet portion of the vehicle for the heat exchange of an air conditioner of the electric vehicle; a first heat sink and second heat sink, which are respectively arranged at the two sides of the front part of the heat exchanger; and a plurality of rotatable and adjustable air deflectors for redirecting air as it flows through the heat exchanger, the first heat sink and the second heat sink.

According to the invention, a number of sensors are arranged for sensing the working temperatures and the environmental temperatures of a battery pack and a motor. Opening and closing states of the air deflectors can be adjusted under different operating states of the air conditioner and different temperatures of the battery pack and the motor, thereby enabling the heat energy dissipated from the first heat sink and the second heat sink to be utilized in an efficient manner

DETAILED DESCRIPTION

Various embodiments of the present invention will be described below with reference to accompanying drawings constituting a part of the description. It should be understood that, although terms, such as "front", "rear", "upper", "lower", "left", "right" and the like, representing directions are used in the present invention for describing various exemplary structural parts and elements of the present invention, these terms are used herein only for the purpose of convenience of explanation and are determined based on the exemplary orientations shown in the accompanying drawings. Since the embodiments disclosed by the present invention can be arranged according to different directions, these terms representing directions are merely used for illustration and should not be regarded as limitation. Wherever possible, the same or similar reference marks used in the present invention refer to the same components.

Figure 1:
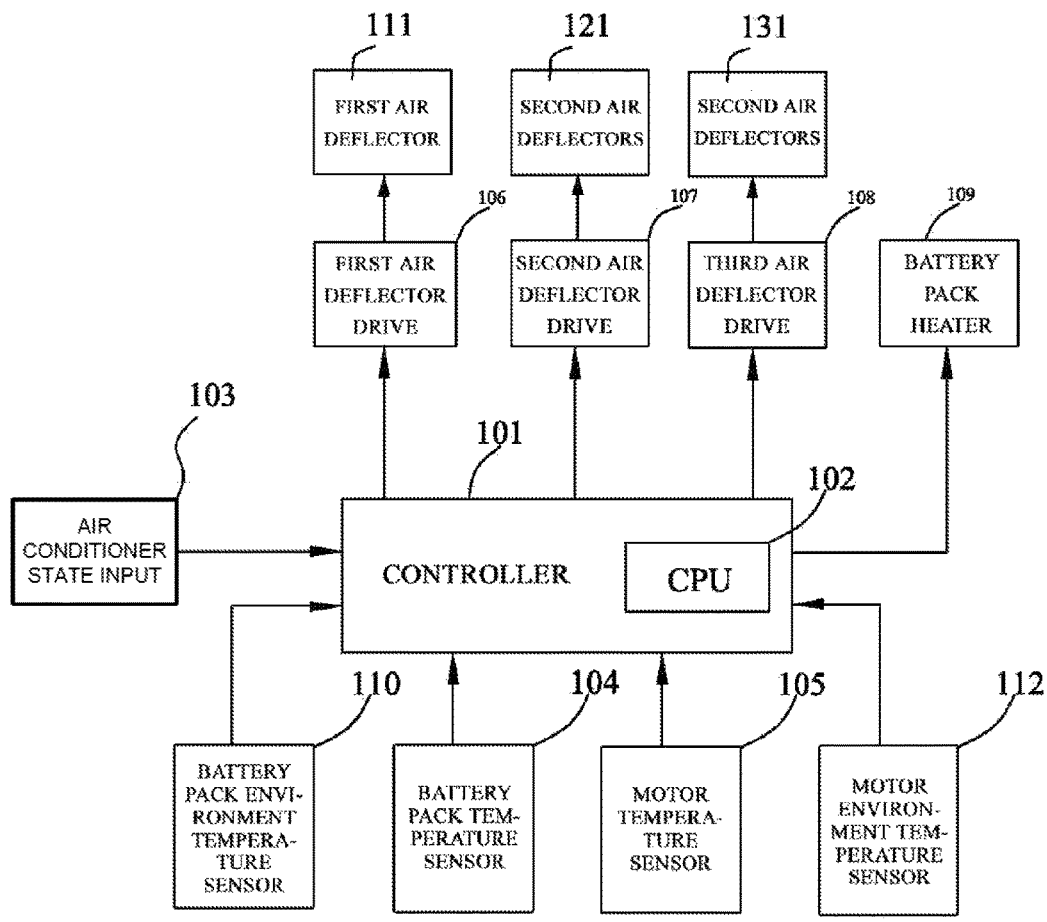
FIG. 1 is a control module diagram of a heat dissipation system in accordance with an exemplary embodiment of the present disclosure.

FIG. 1 is a control module diagram of a heat dissipation system in accordance with an exemplary embodiment of the present disclosure.

As shown in FIG. 1, the control system of the heat dissipation system in the present invention at least includes: a controller 101 (provided with a CPU 102 therein), an air conditioner state input 103, a battery pack temperature monitor 104, motor temperature 105, a battery pack environment temperature sensor 110, a motor environment temperature sensor 112, a first air deflector drive 106, a second air deflector drive 107, a third air deflector drive 108, a battery pack heater 109, a first air deflector 111, second air deflectors 121, third deflectors 131 and so on.

The air conditioner state input 103 can be used for inputting the working states of a vehicle cabin air conditioner, which include the following three states: refrigerating, heating and turned off. The air conditioner state input 103 can take many forms including for a multi-position switch allowing a user to manually select one of the states. In some embodiments, the air conditioner state input 103 can take the form of a controller that varies vehicle cabin air conditioner between states to maintain a desired cabin air temperature. The battery pack temperature monitor 104 is arranged in the battery pack for sensing a $T_b$ in the battery pack; the battery pack temperature monitor 104 is made up of multiple temperature sensors 105 arranged at positions having the highest temperatures in the driving parts of the motor, which can include for example a motor drive, a gear box and the like. A motor working temperature $T_m$ is defined as the average value of the highest temperature readings of these parts. The battery pack environment temperature sensor 110 is arranged at the outside of the battery pack for sensing an environment temperature $T_3$ at the outside of the battery pack. The motor environment temperature sensor 112 is arranged at the outside of the driving parts of the motor, the motor drive, the gear box and the like for sensing the environment temperature $T_4$ at the outside of the driving parts. All of the temperature sensors mentioned above are connected to the controller 101 and can periodically or continuously the sensed temperatures to the controller 101.

The first air deflector 111, the second air deflectors 121 and the third air deflectors 131 are respectively arranged behind an air inlet portion of the vehicle (specifically as shown in FIG. 2A to FIG. 2D). As an embodiment, the air deflector can be of a louver structure, and the air deflector can be in an open, half-open or closed state by virtue of a rotation of the blades of the louver. In the present invention, the embodiments of the present invention are illustrated just by taking the open and closed states as examples; however, the half-open state of the air deflector is also encompassed in the conception of the present invention and can provide various embodiments in which air flow is even further fine-tuned or adjusted to accomplish a desired cooling or heating configuration. For example, in some embodiments, individual vents or subsets of vents of an air deflector could be turned at different angles to customize a flow of air through the air deflector.

When the vehicle is in operation, air can pass through the opened air deflectors. Each of the air deflectors is provided with a drive, namely the first air deflector drive 106, the second air deflector drive 107 and the third air deflector drive 108. The drives can be electric motors (omitted from the figure) for respectively driving the first air deflector 111, the second air deflectors 121 and the third air deflectors 131. The first air deflector drive 106, the second air deflector drive 107 and the third air deflector drive 108 are also connected to the controller 101. The controller 101 respectively sends a control signal to the above-mentioned drives, and the drives control the opening and closing of the air deflectors when at work.

When the temperature of the battery pack is too low, the controller 101 sends a control signal to the battery pack heater 109, and the battery pack heater 109 works to raise the temperature of the battery pack.

As shown in FIGS. 2A-2D, a first heat sink 220, a heat exchanger 210 and a second heat sink 230 are arranged at the front of the vehicle body or in any portion of the vehicle configured to receive incoming air. The first heat sink 220 and the second heat sink 230 are respectively arranged at two sides of the front part of the heat exchanger 210. The heat exchanger 210 can be a heat exchanger associated with the cabin air conditioner. When the conditioner is refrigerating, the heat exchanger 210 is configured to dissipate heat, and when the air conditioner is heating, the heat exchanger is configured to absorb heat. When the heat exchanger 210 transitions between heating and cooling configurations, various heating and/or cooling system components can adjust a temperature of cooling/heating elements of the heat exchanger 210. The first heat sink 220 and the second heat sink 230 can be respectively the heat sinks of the motor and the battery pack.

The first air deflector 111, the second air deflectors 121 and the third air deflectors 131 are respectively arranged between two of the first heat sink 220, the heat exchanger 210 and the second heat sink 230. Specifically, the first air deflector 111 is arranged in front of the heat exchanger 210, and the two ends of the first air deflector 111 are respectively connected with the right end of the first heat sink 220 and the left end of the second heat sink 230. In some embodiments, a central portion of the first air deflector 111 can include a protrusion that helps to smoothly split air contacting the central portion of the first air deflector 111 when the first air deflector 111 is closed. The second air deflectors 121 includes two deflectors, a left second air deflector 121.1 and a right second air deflector 121.2, the two ends of the left second air deflector 121.1 are respectively connected with the right end of the first heat sink 220 and the left end of the heat exchanger 210, and the two ends of the right second air deflector 121.2 are respectively connected with the right end of the heat exchanger 210 and the left end of the second heat sink 230; the third air deflectors 131 includes two deflectors, a left third air deflector 131.1 and a right third air deflector 131.2, the left third air deflector 131.1 is arranged behind the first heat sink 220, and the two ends of the left third air deflector are respectively connected with the left end of the first heat sink 220 and the left end of the heat exchanger 210; the right third air deflector 131.2 is arranged behind the second heat sink 230, and the two ends of the right third air deflector are respectively connected with the right end of the second heat sink 230 and the right end of the heat exchanger 210.

Figure 2A:
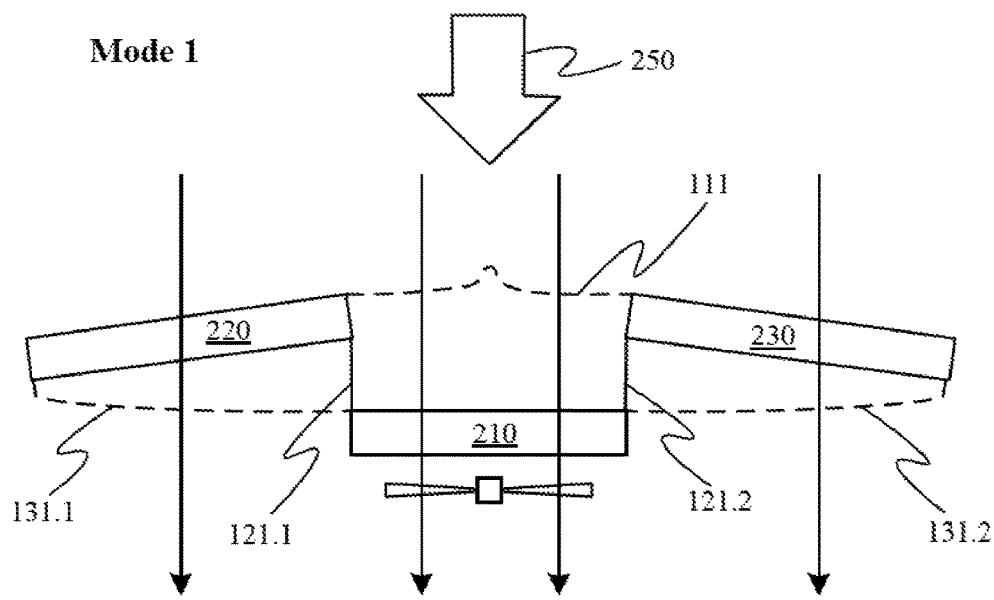
FIG. 2A is a schematic diagram of a working mode I of air deflectors in accordance with an exemplary embodiment of the present disclosure.
Figure 2B:
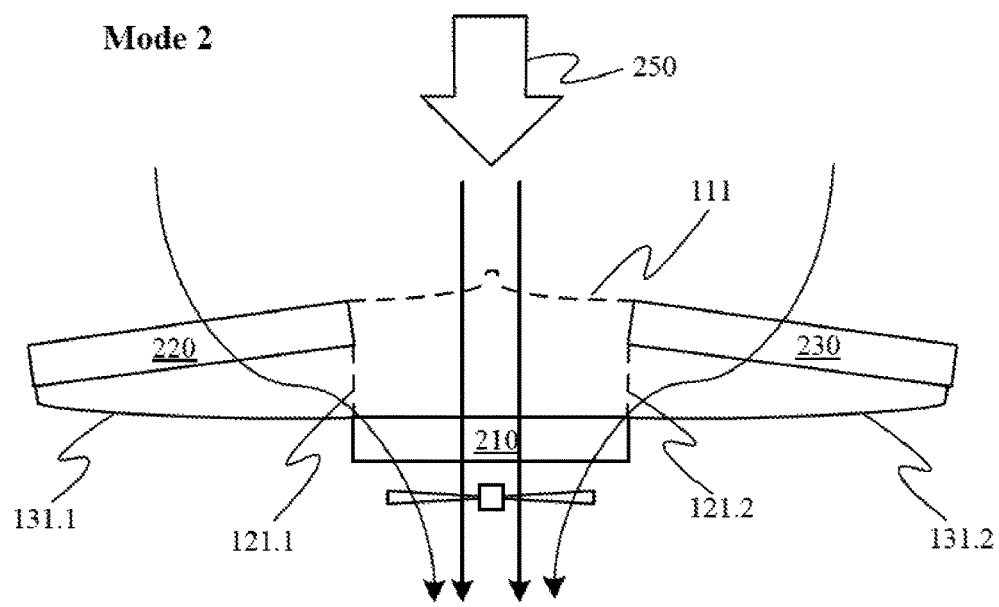
FIG. 2B is a schematic diagram of a working mode II of the air deflectors in accordance with an exemplary embodiment of the present disclosure.

When the vehicle is in operation, air 250 enters into the vehicle and when the first air deflector 111 is open (indicated by a dotted line as depicted in FIGS. 2A-2B), the air can through air deflector 111 to flow directly through the heat exchanger 210. When the second air deflectors 121 are closed (indicated by solid lines), the air exiting the first heat sink 220 the second heat sink 230 cannot flow into the heat exchanger 210. When the third air deflectors 131 are closed and the second air deflectors 121 are open (as depicted in FIG. 2B), the air can flow from the first heat sink 220 and the second heat sink 230 to the heat 210, thereby substantially increasing an average temperature of the air entering the heat exchanger 210.

According to the temperatures of the motor and the battery pack and different states of the cabin air conditioner, the opening and closing of the air deflectors can be adjusted to optimally distribute the heat dissipated by the first heat sink 220 and the second heat sink In some states, at least some of the heat dissipated by the first heat sink 220 and the second sink 230 can be transferred to the heat exchanger 210. The following figures will depict four different working modes that can be assumed by fully opening or closing the air deflectors air deflectors of the thermal dissipation system.

FIG. 2A shows the working mode I of the air deflectors and how the air deflectors affect the incoming air flow.

In mode I, the first air deflector 111 and the third air deflectors 131 are open, the second air deflectors 121 are closed causing the air 250 entering the vehicle to pass through first heat sink 220, the heat exchanger 210 and the second heat sink 230 at the same time. Because the second air deflectors 121 are closed, the portion of air 250 passing through the heat sink 220 and the second heat sink 230 is prevented from passing through the heat exchanger 210. This mode is mainly applicable to the condition that the cabin air conditioner refrigerating. By means of such an arrangement of the air deflectors in this mode, the heat dissipation of the battery pack and the motor has no influence on the refrigeration of the cabin air conditioner while ensuring the heat dissipation effect of the battery pack and the motor.

FIG. 2B shows the working mode II of the air deflectors and how the air deflectors affect the incoming air flow.

In this mode, the first air deflector 111 and the second air deflectors 121 are open, and the third air deflectors 131 are closed. A part of the air 250 passes through the first heat sink 220 and the second heat sink 230 first and then flows through the heat exchanger 210 after being heated by the first heat sink 220 and the second heat sink 230. A portion of the air 250 passes directly through the heat exchanger 210. This mode is mainly applicable to the condition that the cabin air conditioner is turned off and the temperatures of the battery pack and the motor are relatively low. By means of such an arrangement of the air deflectors, a portion of the air 250 passes through the first air deflector 111 to reduce the volume of inlet air passing through the first heat sink 220 and the second heat sink 230. Such a configuration can be beneficial when the battery pack and engine do not require a maximum amount of heat dissipation. This volume of inlet air can ensure the heat dissipation effect of the battery pack and the motor while also allowing an amount of air 250 to engage heat exchanger 210 having been preheated by either of the heat sinks.

Figure 2C:
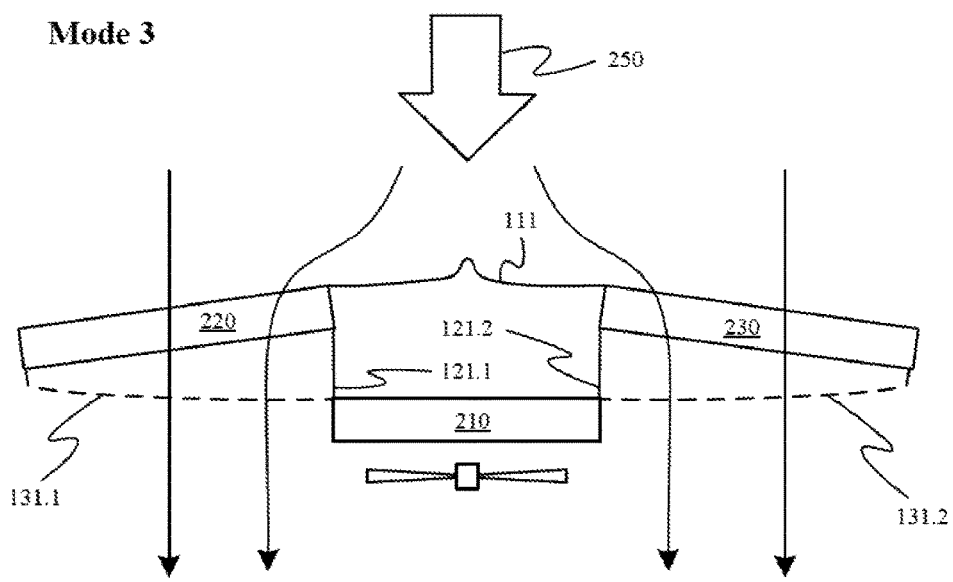
FIG. 2C is a schematic diagram of a working mode III of the air deflectors in accordance with an exemplary embodiment of the present disclosure.

FIG. 2C is a schematic diagram of the working mode III of the air deflectors in the present invention.

In this mode, the first air deflector 111 and the second air deflectors 121 are closed, while the third air deflectors 131 are open. In this mode, all the air entering the vehicle only flows through the first heat sink 220 and the second heat sink 230 without passing through heat exchanger 210. This mode is mainly applicable to the condition that the cabin air conditioner is turned off and the temperatures of the battery pack and the motor are relatively high. Under this condition, by closing the first air deflector 111 and the second air deflectors 121 and opening the third air deflectors 131, all the air passes through the first heat sink 220 and the second heat sink 230, so that the volume of the inlet air passing through the first heat sink 220 and the second heat sink 230 is increased compared with the condition that the first deflector is open, and this volume of inlet air can increase the heat dissipation effect on the battery pack and the motor when the battery pack and motor are operating at higher temperatures. Such a configuration can also be advantageous as it reduces any backpressure introduced by the thermal dissipation system associated with directing the air through heat exchanger 210. In this way cooling provided to the battery pack and the engine can be maximized.

Figure 2D:
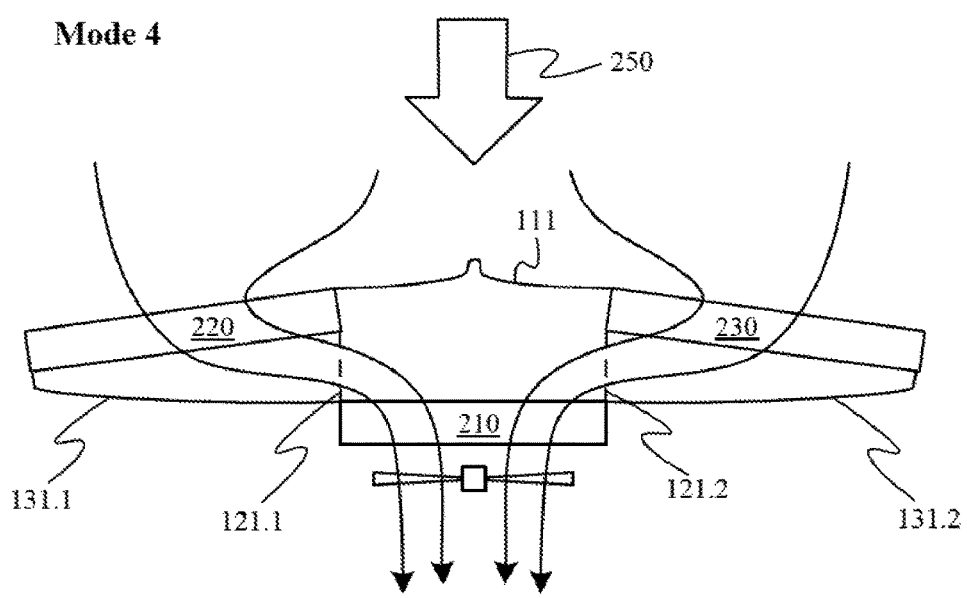
FIG. 2D is a schematic diagram of a working mode IV of the air deflectors in accordance with an exemplary embodiment of the present disclosure.

FIG. 2D shows the working mode IV of the air deflectors and how the air deflectors affect the incoming air flow.

In this mode, the first air deflector 111 and the third air deflectors 131 are closed, the second air deflectors 121 are open, and all the air entering the vehicle flows through the first heat sink 220 and the second heat sink 230 first and then flows through the heat exchanger after being heated. This mode is mainly applicable to the condition that the cabin air conditioner is heating. Under this condition, by closing the first air deflector in front of the exchanger 210, the air firstly flows through the first heat sink 220 and the second heat sink to absorb the heat dissipated from the battery pack and the motor and then transfers some of absorbed heat to the heat exchanger 210, such that the heat exchanger 210 can effectively utilize the heat dissipated from the battery pack and the motor to provide warm air to the cabin.

Figure 3:
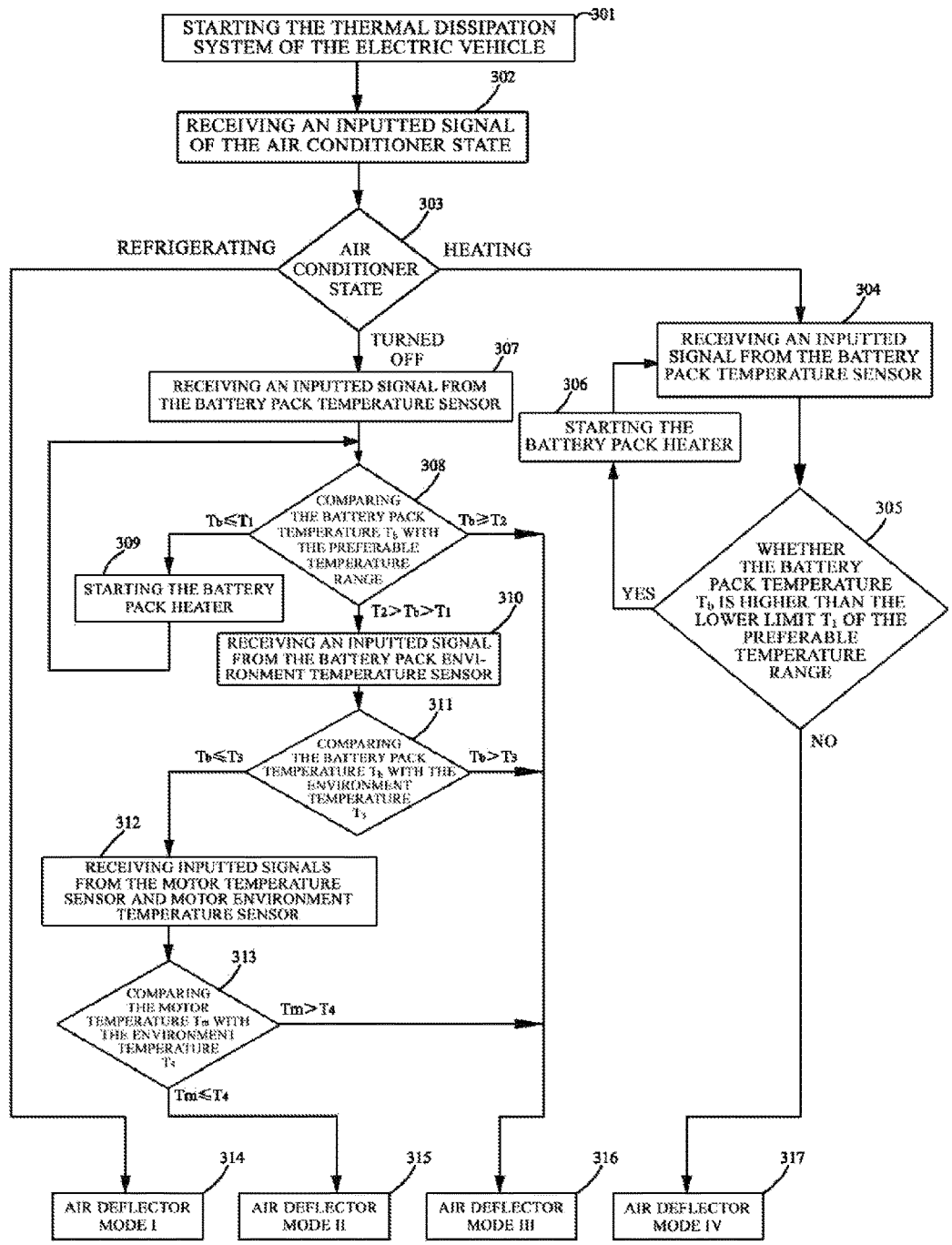
FIG. 3 is a schematic diagram of a control flow of the heat dissipation system in accordance with an exemplary embodiment of the present disclosure.

FIG. 3 shows one manner in which a controller can be configured to switch between each of the four working modes in accordance with an operating state of the air conditioner various temperature sensor readings.

FIG. 3 is a schematic diagram of the control flow of the thermal dissipation system in the present invention. The controller 101 executes the steps as shown in FIG. 3. At Step 301, the thermal dissipation system of the electric vehicle is started. Step 302 includes receiving a state signal of the air conditioner inputted via the air conditioner state input 103. At step 303, the following operations are executed in accordance with the state signal of the air conditioner received in step 302.

Heating State:

At step 304, a battery pack temperature $T_b$ is received by a signal transmitted by a battery pack temperature sensor 104.

At step 305: judging whether the battery pack temperature $T_b$ is lower than the lower limit $T_1$ (the first preferable temperature of $T_1$ is 8° C., and the second preferable temperature $T_1$ is 0° C.) of a preferable temperature range of the battery pack according to the temperature signal received in step 304; if yes, executing step 306; if no, executing step 317.

At step 306, sending a control signal to the battery pack heater 109 to drive the battery pack heater 109 to work in order to increase the battery pack temperature $T_b$, and then repeating step 304.

At step 317, sending a control signal to the first air deflector drive 106, the second air deflector drive 107 and the third air deflector drive 108 to make the air deflectors (111, 121, 131) operate in mode IV.

Turned Off State:

At step 307, receiving a battery pack temperature $T_b$ signal inputted by the battery pack temperature sensor 104.

At step 308 determining whether the battery pack temperature $T_b$ is between the upper limit $T_2$ (the first preferable temperature of $T_2$ is 25° C., the second preferable temperature of $T_2$ is 35° C. and the third preferable temperature of $T_2$ is 45° C.) and the lower limit $T_1$ of the preferable temperature range of the battery pack according to the battery pack temperature signal received in step 307. When $T_b \leq T_1$ indicating the battery is operating below the preferable temperature range, executing step 309. When $T_1 < T_b < T_2$ indicating the battery is operating within the preferable temperature range, executing step 310. When $T_b \geq T_2$ indicating the battery is operating above the preferable temperature range executing step 316.

At step 309, sending a control signal to the battery pack heater 109 to drive the battery pack heater 109 to work in order to raise the battery pack temperature $T_b$ up towards $T_1$, and then repeating step 308.

At step 310, receiving a battery pack environment temperature $T_3$ signal inputted by a battery pack environment temperature sensor 110;

At step 311, judging whether the battery pack temperature $T_b$ is higher than the battery pack environment temperature $T_3$ according to the battery pack temperature $T_b$ signal received in step 307 and the battery pack environment temperature $T_3$ signal received in step 310; if yes, executing step 316, if no, executing step 312;

At step 312, receiving a motor working temperature $T_m$ signal and a motor environment temperature $T_4$ signal inputted by the motor temperature sensor 105 and the environment temperature sensor 112;

At step 313: judging whether the motor working temperature $T_m$ is higher than the motor environment temperature $T_4$ according to the motor working temperature $T_m$ signal and the motor environment temperature $T_4$ signal received in step 312; if yes, executing step 316, no, executing step 315;

At step 315: sending a control signal to the first air deflector drive 106, the second air deflector drive 107 and the third air deflector drive 108 to make the air deflectors (111, 121, 131) be in mode II;

At step 316: sending a control signal to the first air deflector drive 106, the second air deflector drive 107 and the third air deflector drive 108 to make the air deflectors (111, 121, 131) be in mode III; and Refrigerating State:

At step 314, sending a control signal to the first air deflector drive 106, the second air deflector drive 107 and the third air deflector drive 108 to arrange the air deflectors (111, 121, 131) in accordance with mode I;

The flowcharts of determining different modes of the air deflectors (111, 121, 131) are described above, in order to achieve the comprehensive utilization of energy sources among the first heat sink 220, the second heat sink 230 and the heat exchanger 210 to optimally manage the energy sources.

Although the present invention has been described with reference to the specific embodiments shown in the accompanying drawings, it should be understood that the thermal dissipation system of electric vehicles provided by the present invention can have a variety of variations without departing from the spirit, scope and background of the present invention. Those of ordinary skill in the art should be still aware that, parameters in the embodiments disclosed by the present invention can be changed in different manners, and these changes fall within the spirit and scope of the present invention and the claims.

What is claimed is:

1. A thermal dissipation system suitable for placement within a channel defined by a vehicle that draws ambient air through the channel during operation of the vehicle, the thermal dissipation system comprising:
   a heat exchanger configured to provide cooling and heating for a cabin air conditioning system;
   a first heat sink and a second heat sink arranged forward of and laterally shifted to opposing sides of the heat exchanger, each of the heat sinks configured to be in thermal contact with an operational heat emitting component of the vehicle; and
   a plurality of air deflectors configured to alter a flow of the ambient air through the heart exchanger and the first and second heat sinks by switching between two or more configurations of the thermal dissipation system including a first configuration and a second configuration, wherein
   the first configuration is a heating configuration for the cabin air conditioning system and the second configuration is a cooling configuration for the cabin air conditioning system.

2. The thermal dissipation system as recited in claim 1, wherein the plurality of air deflectors comprises a first air deflector positioned in front of the heat exchanger and spanning the gap between the first and second heat sinks.

3. The thermal dissipation system as recited in claim 2, wherein the plurality of air deflectors further comprises second air deflectors arranged to prevent air passing through the first and second heat sinks from flowing into the heat exchanger.

4. The thermal dissipation system of claim 3, wherein the plurality of air deflectors further comprises third air deflectors arranged to redirect air exiting the first and second heat sinks into an air intake of the heat exchanger.

5. The thermal dissipation system of claim 4, wherein in the first configuration the first deflector and the third deflectors are closed while the second deflectors are left open.

6. The thermal dissipation system of claim 4, wherein in the second configuration the first deflector and the third deflectors are left open while the second deflectors are closed.

7. The thermal dissipation system of claim 1, wherein the operational heat emitting components of the vehicle are a motor and a battery pack.

8. The thermal dissipation system of claim 7, further comprising:
   a controller for adjusting the closing and opening of the plurality of air deflectors in accordance with an operating state of the heat exchanger and the temperatures of the motor and the battery pack.

9. The thermal dissipation system of claim 8, further comprising:
   a first temperature sensor disposed within the battery pack; and
   a second temperature sensor disposed within the motor, wherein the first and second temperature sensors periodically send signals to the controller indicating temperature changes in the motor and the battery pack.

10. An electric vehicle, comprising:
    a vehicle chassis defining an air inlet;
    an air conditioning system configured to govern a temperature within the electric vehicle;
    a motor;
    a battery pack configured to provide energy to the motor; and
    a thermal dissipation system positioned proximate the air inlet and configured to receive air entering the air inlet, the thermal dissipation system comprising:
       a heat exchanger in thermal contact with the air conditioning system,
       a first and a second heat sink in thermal contact with the motor and the battery pack respectively, the first and second heat sinks being positioned forward of and on opposing sides of the heat exchanger,
    a plurality of air deflectors configured to alter a flow of the ambient air through the heart exchanger and the first and second heat sinks by switching between two or more configurations of the thermal dissipation system including a first configuration and a second configuration, wherein the first configuration is a heating configuration for the cabin air conditioning system and the second configuration is a cooling configuration for the cabin air conditioning system, and
    a controller configured to direct configuration changes of the plurality of air deflectors.

11. The electric vehicle of claim 10, wherein when the thermal dissipation system is operating in a heating state the controller directs the plurality of air deflectors to divide the air received through the air inlet so that a first portion of the air passes through the first heat sink and a second portion of the air passes through the second heat sink and then the first and second portions of the air are subsequently recombined to pass through the heat exchanger.

12. The electric vehicle of claim 10, further comprising:
    a battery pack heater in communication with the controller and configured to supply heating to the battery pack when the thermal dissipation system is in a heating mode.

13. The electric vehicle of claim 10, further comprising:
    a battery pack temperature sensor arranged in the battery pack and connected to the controller for sensing a working temperature of the battery pack and sending a temperature signal to the controller;
    a motor temperature sensor arranged in the motor and connected to the controller for sensing a working temperature of the motor and sending a temperature signal to the controller;
    an air conditioner state input connected to the controller for sending a working state of the air conditioner to the controller;
    a battery pack environment temperature sensor arranged at the outside of the battery pack and connected to the controller for sensing the environment temperature of the battery pack and sending a temperature signal to the controller; and a motor environment temperature sensor arranged at the outside of the motor and connected to the controller for sensing the environment temperature of the motor and sending a temperature signal to the controller.

14. The electric vehicle of claim 10, further comprising:

a first air deflector drive, a second air deflector drive and a third air deflector drive, which are used for receiving the control signals of the controller and respectively controlling the opening and closing of a first air deflector, a second air deflector and a third air deflector of the plurality of air deflectors.

15. A thermal dissipation system suitable for placement within a channel defined by a vehicle that draws ambient air through the channel during operation of the vehicle, the thermal dissipation system comprising:

a heat exchanger configured to provide cooling and heating for a cabin air conditioning system;

a first heat sink and a second heat sink arranged forward of and laterally shifted to opposing sides of the heat exchanger, each of the heat sinks configured to be in thermal contact with an operational heat emitting component of the vehicle; and a plurality of air deflectors configured to alter a flow of the ambient air through the heart exchanger and the first and second heat sinks by switching between two or more configurations of the thermal dissipation system including a first configuration and a second configuration, wherein the first configuration is a heating configuration for the cabin air conditioning system and the second configuration is a cooling configuration for the cabin air conditioning system, wherein the plurality of air deflectors comprises a first air deflector positioned in front of the heat exchanger and spanning the gap between the first and second heat sinks.

16. The thermal dissipation system as recited in claim 15, wherein the plurality of air deflectors further comprises second air deflectors arranged to prevent air passing through the first and second heat sinks from flowing into the heat exchanger.

17. The thermal dissipation system of claim 16, wherein the plurality of air deflectors further comprises third air deflectors arranged to redirect air exiting the first and second heat sinks into an air intake of the heat exchanger.

18. The thermal dissipation system of claim 17, wherein in the first configuration the first deflector and the third deflectors are closed while the second deflectors are left open.

19. The thermal dissipation system of claim 18, wherein in the second configuration the first deflector and the third deflectors are left open while the second deflectors are closed.

20. The thermal dissipation system of claim 17, wherein the operational heat emitting components of the vehicle are a motor and a battery pack.

* * * * *